(12) United States Patent
Higgins et al.

(10) Patent No.: US 8,166,016 B2
(45) Date of Patent: Apr. 24, 2012

(54) SYSTEM AND METHOD FOR AUTOMATED SERVICE RECOMMENDATIONS

(75) Inventors: Christopher William Higgins, Portland, OR (US); Marc Eliot Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 665 days.

(21) Appl. No.: 12/339,355

(22) Filed: Dec. 19, 2008

(65) Prior Publication Data
US 2010/0161600 A1 Jun. 24, 2010

(51) Int. Cl.
*G06F 17/30* (2006.01)
(52) U.S. Cl. ........................................................ 707/706
(58) Field of Classification Search .............. 707/5, 706; 709/228; 455/456.6
See application file for complete search history.

(56) References Cited

U.S. PATENT DOCUMENTS

| | | | |
|---|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |

(Continued)

FOREIGN PATENT DOCUMENTS

EP 1362302 11/2003

(Continued)

OTHER PUBLICATIONS

Jones et al., Geographic Intention and Modification in Web Search, International Journal of Geographical Information Science, vol. 22, No. 3, pp. 1-20 (Jul. 2008).

(Continued)

*Primary Examiner* — Etienne Leroux
(74) *Attorney, Agent, or Firm* — James J. DeCarlo; Greenberg Traurig, LLP

(57) ABSTRACT

A system and method for automated service recommendations. A request is received over a network, from a user for service recommendations, wherein the request comprises an identification of the user and at least one service selection criteria. A query is formulated so as to search, via the network, for user profile data, spatial data, temporal data, social data and topical data that is available via the network and relates to the requesting user, the service selection criteria and to a plurality of services available via the network so as to a identify a subset of the plurality of services available via the network that relate to the request. A list of the identified subset of services is transmitted, via the network, to the requesting user. A selection of at least one of the selected subset of services available received from the user and the user is enrolled in the selected service.

46 Claims, 12 Drawing Sheets

U.S. PATENT DOCUMENTS

| | | |
|---|---|---|
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman et al. |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Tenenbaum |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0072946 A1* | 6/2002 | Richardson ...................... 705/8 |
| 2002/0099695 A1 | 7/2002 | Abaijian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |

| | | |
|---|---|---|
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0060417 A1* | 3/2005 | Rose .............................. 709/228 |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgernstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0209050 A1* | 9/2007 | Fraleu .............................. 725/63 |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0294627 A1* | 11/2008 | Wadsworth ....................... 707/5 |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |

| | | | |
|---|---|---|---|
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0082038 A1* | 3/2009 | McKiou et al. | 455/456.6 |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,259, filed Nov. 18, 2008, Martinez.
U.S. Appl. No. 12/241,198, filed Sep. 30, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12,273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
"Technical White Paper: Choosing the best 2D barcode format for mobile apps, "Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&hl=en&Ir=&9=cache:vbwsIsm1CisJ:www.openu . acil/Personal_sites/tarnirtassa/Publications/hcm.pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCCL '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

O'Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarvas, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM '03'Berkeley: California. 12 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >. . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p...,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/076,690, filed Mar. 19, 2009, Davis.
U.S. Appl. No. 12/407,681, filed Mar. 19, 2009, Athsani.

International Search Report (PCT/US2009/030405) dated Sep. 23, 2009; 2 pages.

U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.

International Search Report PCT/US2009/030406 dated Sep. 29, 2009; 5 pages.

International Search Report and Written Opinion PCT/US2009/034445 dated Oct. 12, 2009; 7 pages.

Office Action U.S. Appl. No. 12/041,054 dated Oct. 27, 2010; 15 pages.

Office Action U.S. Appl. No. 12/041,062 dated Oct. 28, 2010; 12 pages.

International Search Report PCT/US2009/034444 dated Sep. 18, 2009; 2 pages.

Office Action U.S. Appl. No. 12/041,088 dated Oct. 4, 2010; 18 pages.

Almieda, R.B. et al. "A Community-Aware Search Engine," WWW2004, New York., NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/0, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20, 25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Davis, Marc et al., "From Context to Content: Leveraging Context to Infer Media Metadata", ACM Press, Oct. 10, 2004, pp. 1-8.

Kaasinen, E., "Behaviour & Information Technology", Taylor & Francis, vol. 24, No. 1, Jan./Feb. 2005, pp. 37-49, (Abstract only attached).

Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).

Lin, F. et al., "A unified framework for managing Web-based services.", Information Systems and e-Business Management, vol. 3, Oct. 2005, p. 299, (pp. 1-15 of attached).

Metz, Cade, "MySpace Nation", PC Magazine, Jun. 21, 2006, pp. 1-10 attached.

Perkowitz, Mike et al., "Utilizing Online Communities to Facilitate Physical World Interactions", The International Conference on Communities and Technologies, Sep. 19, 2003, Amsterdam, pp. 1 6.

Roush, Wade, "Social Machines", Continuous Computing Blog, Jul. 5, 2005, pp. 1-21.

Roush, Wade, "Social Machines", Technology Review, Aug. 2005, pp. 45-51.

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).

Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.

"Dave.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).

"Emerging Markets: What media 2.0 can offer advertisers.", Campaign, Oct. 27, 2006, p. 26, (pp. 1-5 of attached).

"Reality Digital Debuts Opus", www.lightreading.com. Sep. 25, 2006, pp. 1.

"Reality Digital—Making Media Move", www.realitydigital.com, Nov. 28, 2006, pp. 1-2.

Notification of Transmittal of the International Search Report and the Written Opinion of the International Search Authority, or Declaration (PCT/US2007/'084797) dated Mar. 21, 2008; 11 pages.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags."Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

Nedos, A; Singh K., Clarke S, Proximity Based Group Communications for Mobile Ad Hoc Networks, Proximity-Based Group Communication; Global Smart Spaces; D.14; Oct. 3, 2003; 31 pages.

Brunato, M; Battiti R. "PILGRIM: A Location Broker and Mobility-Aware Recommendation System"; Technical report DIT-02-0092, Universita di Trento, Oct. 2002; 8 pages.

Backstrom et al., Spatial Variation in Search Engine Queries, WWW•2008, Beijing, China (Apr. 21-25, 2008).

Gan et al., Analysis of Geographic Queries in a Search Engine Log, LocWeb 2008, Beijing, China (Apr. 22, 2008).

International Search Report and Written Opinion (PCT/US2009/046258) dated Dec. 23, 2009; 7 pages.

* cited by examiner

SYSTEM AND METHOD FOR AUTOMATED SERVICE RECOMMENDATIONS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for managing data relating to users on a network and, more particularly, to systems and methods for automatically recommending services to users based, in part, on data relating to users behavior on a network.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method. A request is received over a network, from a user for service recommendations, wherein the request comprises an identification of the user and at least one service selection criteria. A query is formulated so as to search, via the network, for user profile data, spatial data, temporal data, social data and topical data that is available via the network and relates to the requesting user, the service selection criteria and to a plurality of services available via the network so as to a identify a subset of the plurality of services available via the network that relate to the request. A list of the identified subset of services is transmitted, via the network, to the requesting user. A selection of at least one of the identified subset of services available received from the user and the user is enrolled in the selected service.

In another embodiment, the invention is a system comprising: an agent manager that certifies agent types, stores agent definitions and spawns agents in response to commands to create agents; a permissions manager that enables users to define permissions granted to agents acting on their behalf and to define user data which is not to be disclosed without authorization; a proxy manager that verifies that agents have legally sufficient authorization to act as proxies for users, wherein agents spawned by the agent manager register with the proxy manager and are not allowed to execute agent functions until the agents are verified; a user manager that receives requests for service recommendations from users, wherein the requests each comprise an identification of a user and at least one service selection, wherein for each request, the user manager is configured to command the agent manager to spawn a personal recommender agent that identifies a subset of a plurality of services available via the network that relate to the request.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
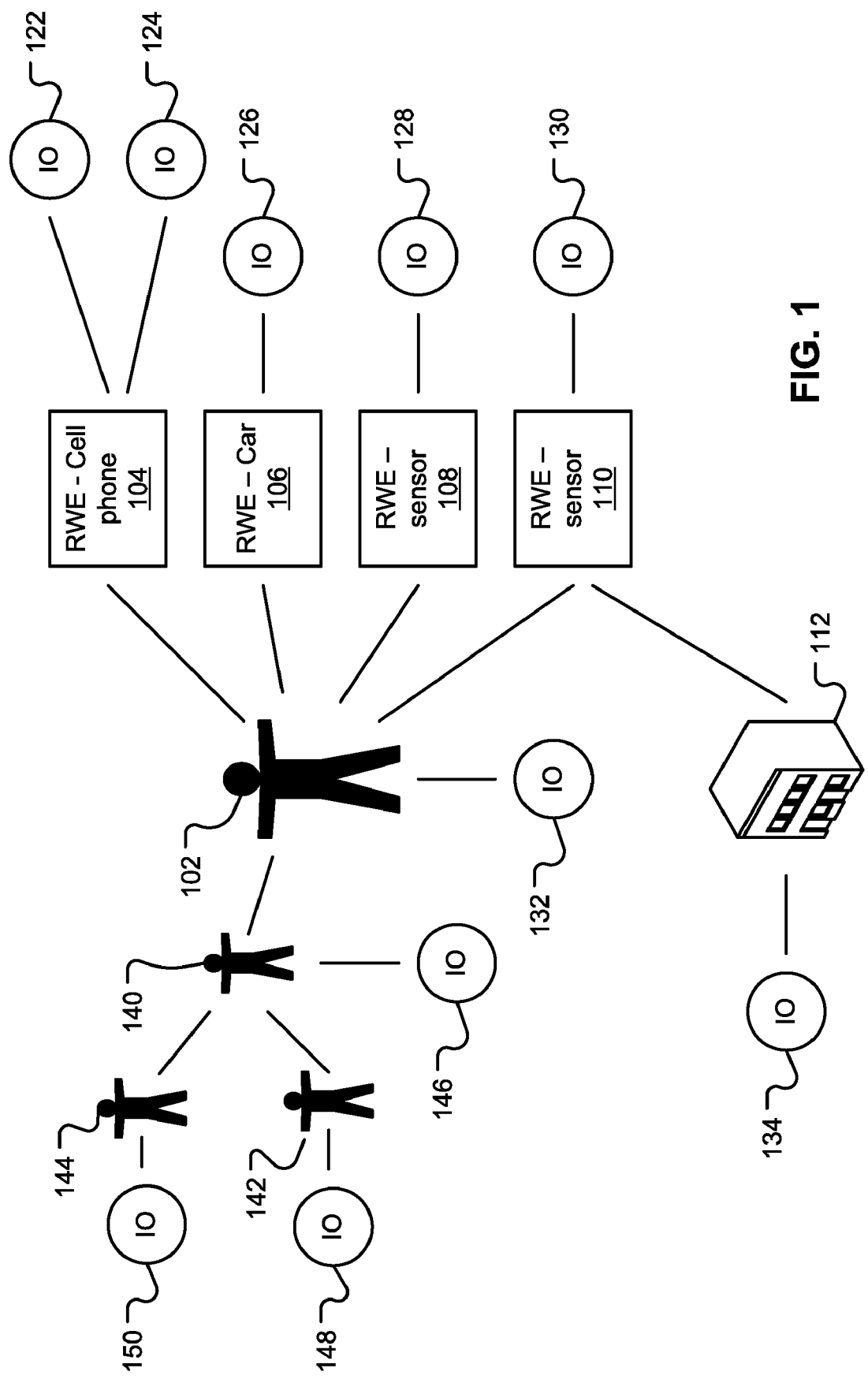
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (TO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/ significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWEs on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
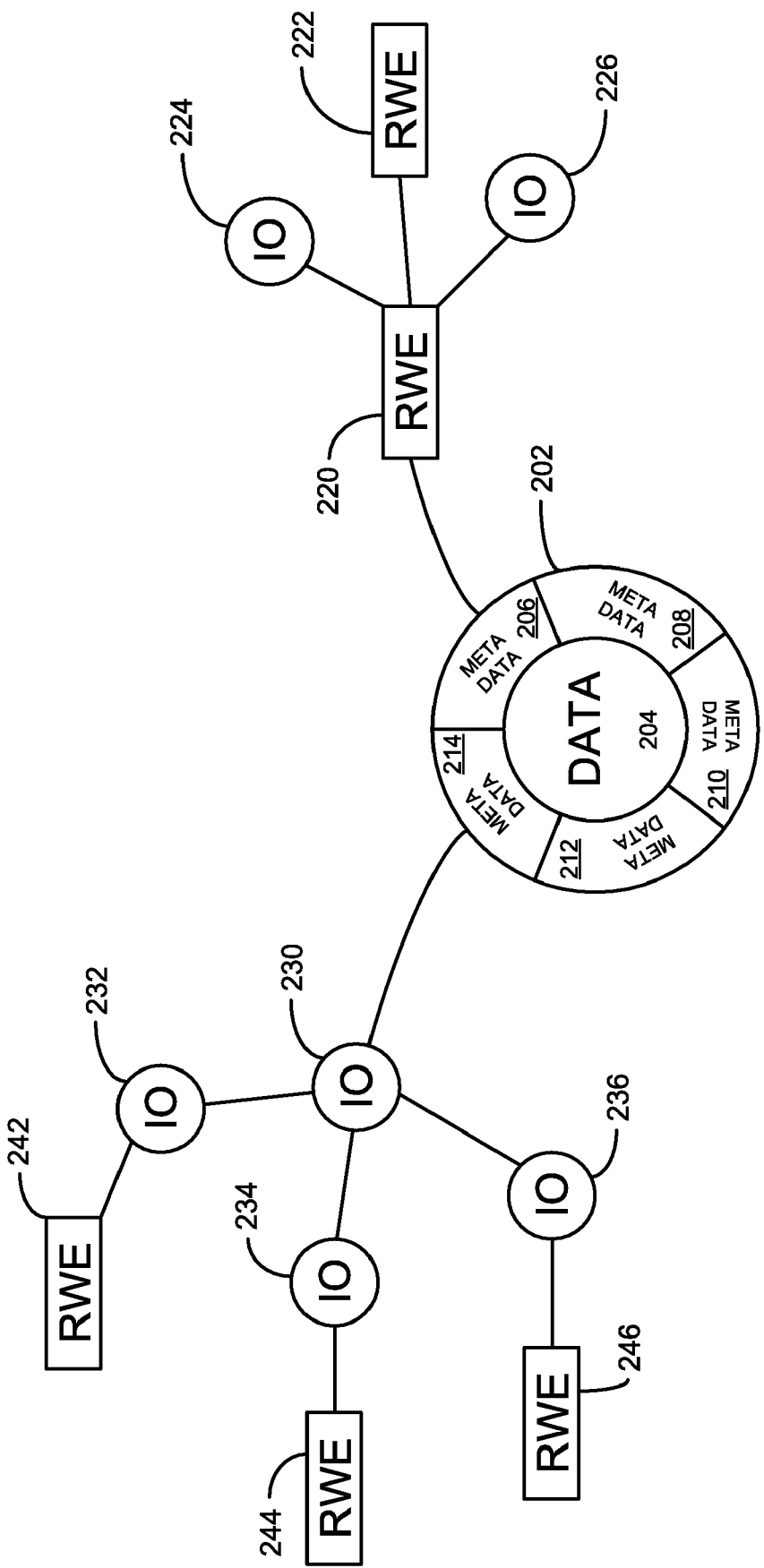
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
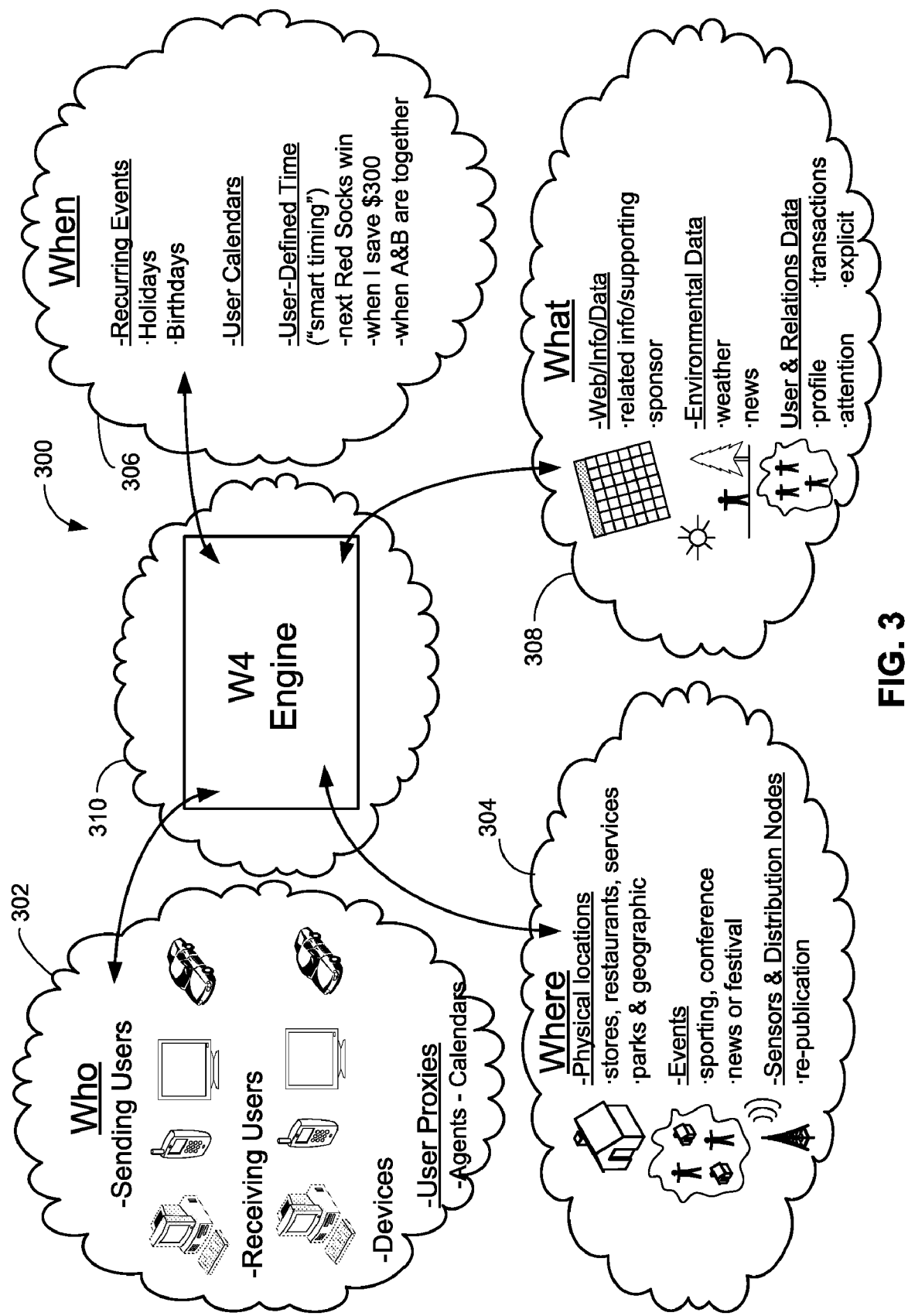
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4

COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
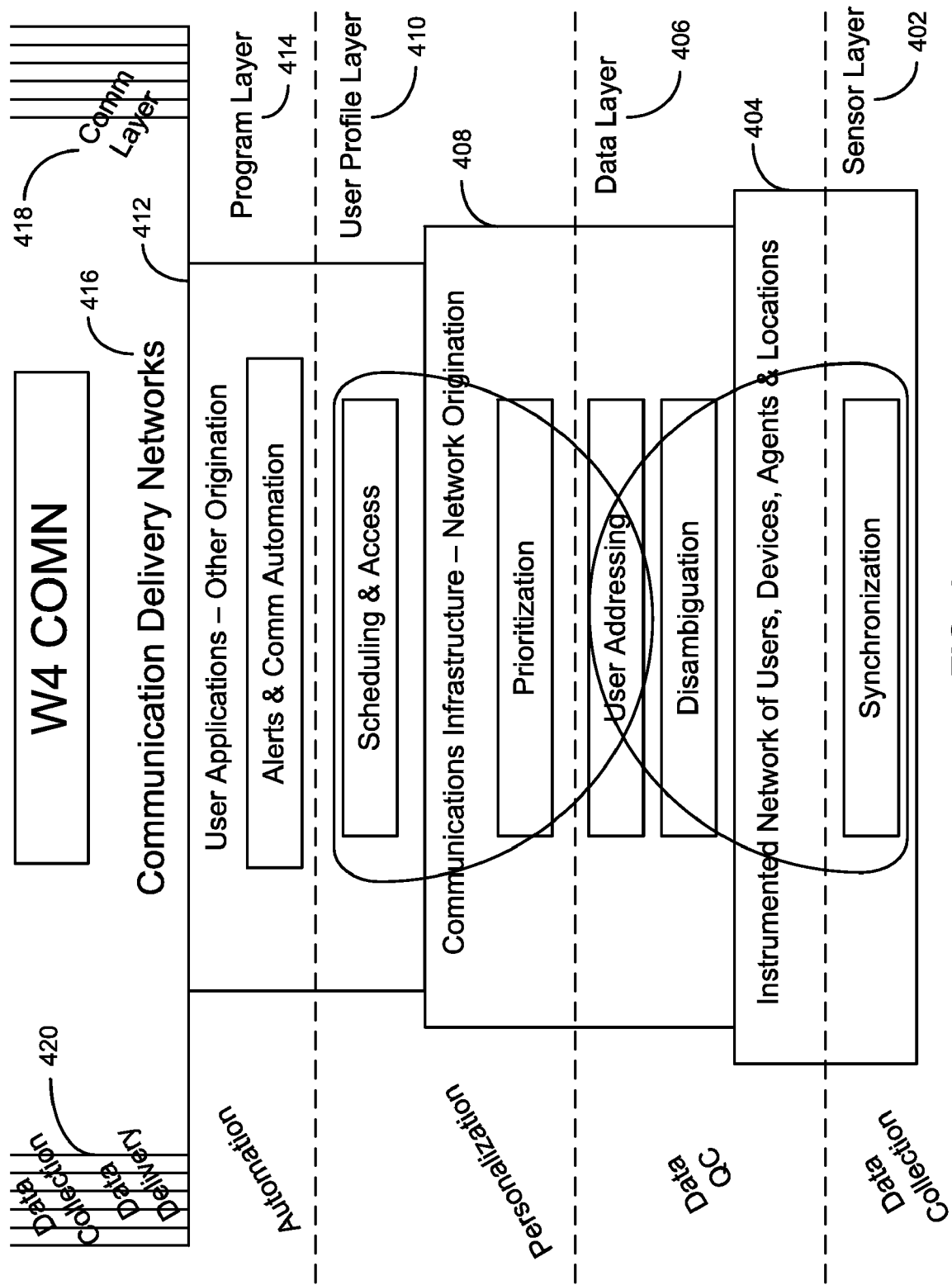
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
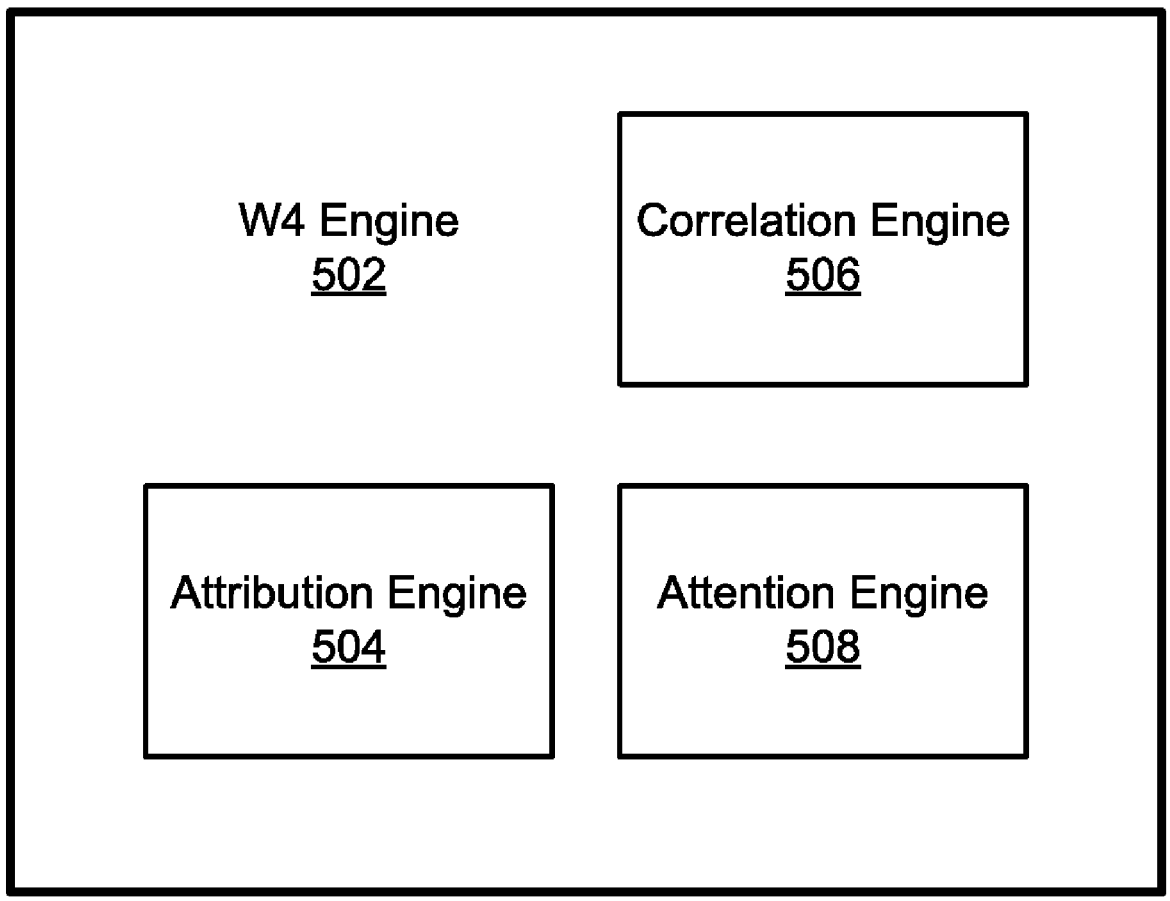
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
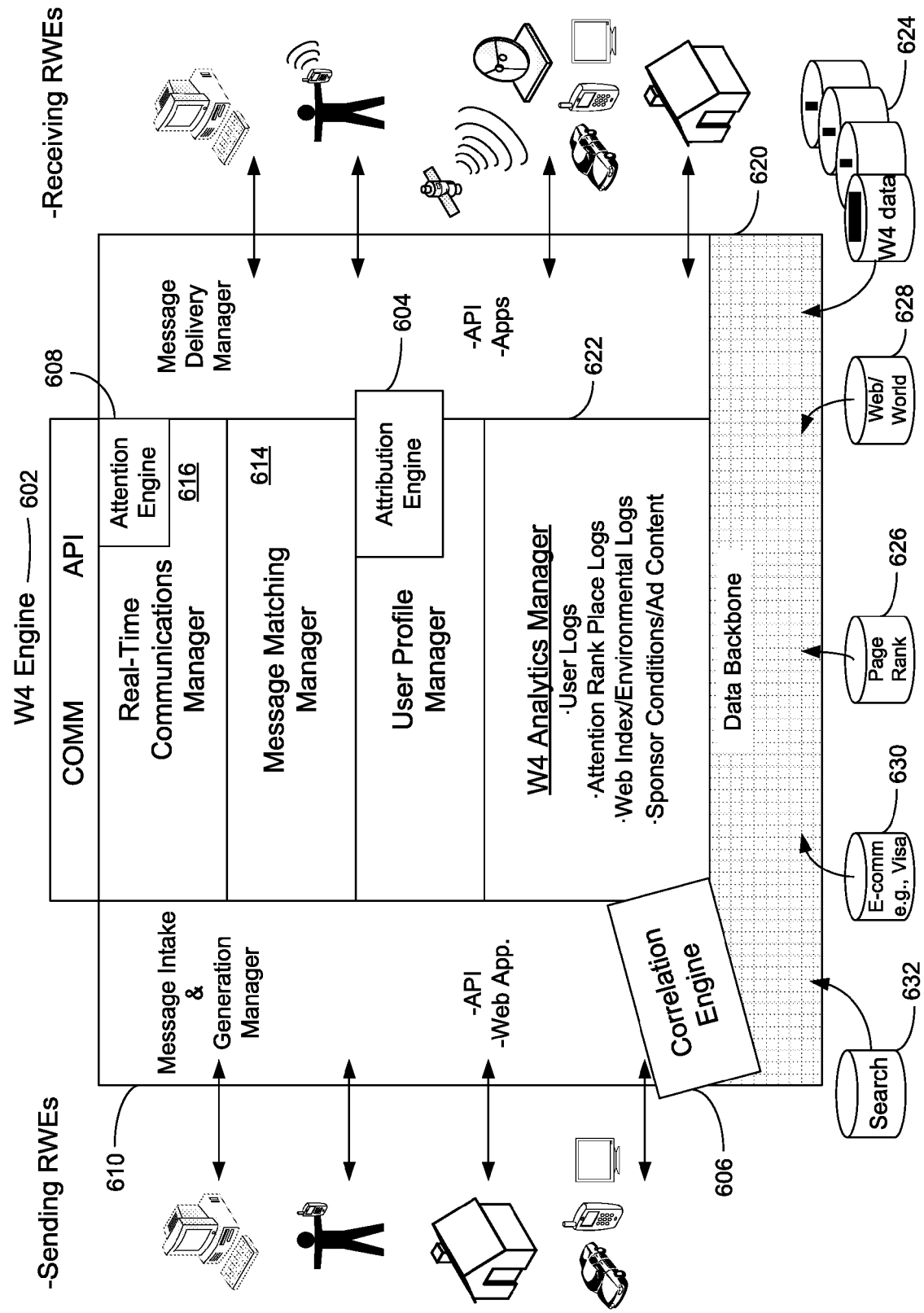
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |

TABLE 2-continued

Examples of Interaction Data

| Type of Data | Example(s) |
|---|---|
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Automated Service Recommendations

A W4 COMN collects, stores and indexes as a rich mine of spatial, temporal, social and topical data relating to individual entities known to the network. Such data can include, among other things user profile data, user demographics data, user preference data, user interaction data, user transaction data, user social network data and user location history. Over time, services will evolve within a W4 COMN to exploit this mine of data. Such services can include, for example, scheduling, communications, e-commerce management, content or other digital service licensing and re-publication, mapping, co-op commercial participation, advocacy management, advocacy and expert qualification plans, content or inventory mgmt plans, and so forth.

As the number of services in a W4 COMN grow, however, it becomes more and more difficult for individual users to identify which of the available services may be of value to them. As a result, users are overwhelmed, confused and adoption of services suffers. A W4 COMN can help alleviate this problem by using Agents to automatically match spatial, temporal, social and topical data relating to individual users to data relating to available services, identifying services that relate to the users' interests, activities and needs. Such Agents can then recommend such services to users, and additionally aid users in registering with such services, thus automating the process of identifying user needs, identifying matching available services, enrolling the user in such services and initiating the service on user's accounts and devices.

In one embodiment, W4 Agents are proxy IOs of either a Real-World Entity (RWE) (e.g. a human, a corporation, a location, etc.), or another IO, (e.g. a W4 application or service, a PIM app, etc.) In one embodiment, W4 Agents can be legally authorized or non-legally authorized embodiments. Legally-Authorized Agents are a special class of Agents that include a documented, verified and certified right of representation for the user and can enter into legally binding transactions on behalf of the user.

Over time, Agents can stand in as the proxy for users in W4 service requests, data requests, review or rating requests, reputation verification, data or identity certification, etc. In one embodiment, a W4 Agent (or suite of Agents) can be specialized to cover specific instances, functions or services on the W4COMN. Agents can work together, in pairs or in hierarchical structures of parent child agents representing complex W4 data crunching objectives.

Figure 7:
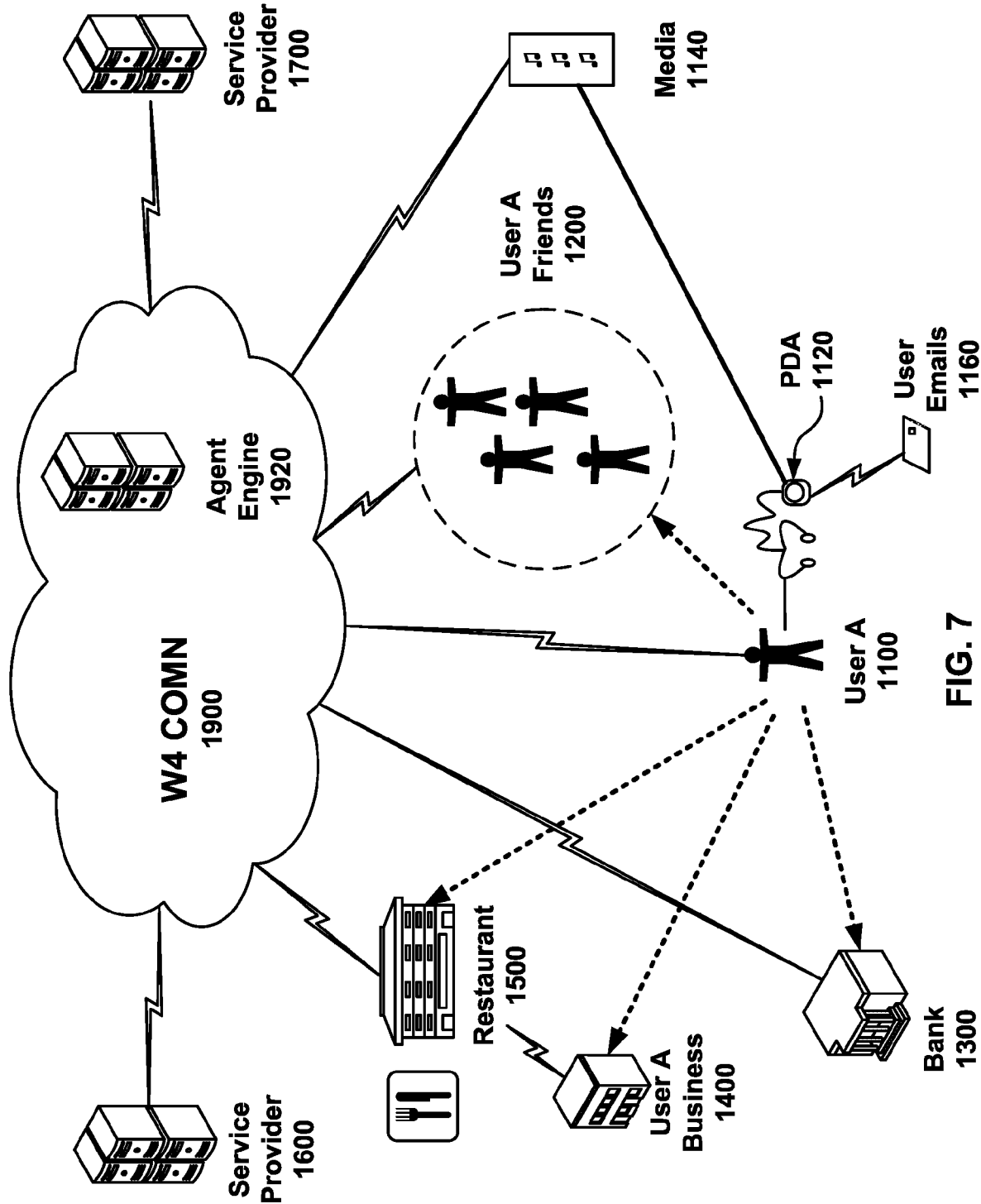
FIG. 7 illustrates one embodiment of the use of an agent based service recommendation system within a W4 COMN for providing automated service recommendations and registration.

FIG. 7 illustrates one embodiment of the use of an agent based service recommendation system within a W4 COMN for providing automated service recommendations and registration.

In the illustrated embodiment, User A 1100 is known to the W4 COMN. The user 1100 has a PDA 1120, also known to the W4 COMN, which has access to the Internet and can be used, inter alia, for sending emails 1160. The PDA 1100 is further capable of playing media files and is used by User A to download and play media files 1140. The physical location of the PDA 1120 can be determined by the W4 COMN using a conventional methodology such as, for example, triangulation of cell signals, determination of the nearest cell tower or through an embedded GPS device or co-location with same. The user 1100 has a group of friends 1200 that are known to the W4 COMN. User A 1100 is owner of a business 1400 and has personal and business accounts at a bank 1300. User A is a patron of a restaurant 1500 and dines there frequently.

User A's bank accounts at the bank 1300 are known to the W4 COMN. All transactions on these accounts are known to the W4 COMN. The W4 COMN can archive all of a user's transactions on storage available to the network, or may access such data through third party data sources known to the W4 COMN. Such sources may include websites which provide access to the user's bank account information or credit or debit card transaction information. Third party data sources can also include websites, RSS feeds and any other type of network accessible data sources that provide any type of data relevant to entities or objects defined within the W4 COMN, such as, for example, a metadata provider that provides metadata for media objects.

All of the above entities are known to a W4 COMN 1900. Outside the finite set of data, persons and locations known to User A 1100 are a large, and potentially unbounded set of entities and data known to the network that can be indirectly related to User A. For example, User A's friends 1200 may patronize different businesses or may each have his or her own unique media. The network collects spatial, temporal, social, and topical data, including behavioral and interaction data and location history about these entities as well as annotations, media or messages created at, by or about those users, locations or businesses.

Service providers 1600 and 1700 provide a variety of services through the W4 COMN 1900 that may be of interest to end users such as User A 1100. Such services can be services of interest to User A 1100 personally, such as social networking services, personal finance services, music download services, travel services, and so forth. Such services can be services of interest to User A 1100 as owner of Business A 1400, such as corporate finance services, e-commerce management, shipping and receiving, wholesale products or business supplies. In one embodiment, the W4 COMN 1900 includes an Agent Engine 1920 that provides agent based services that enable users to identify and enroll in services provided by or through the W4 COMN.

Figure 8:
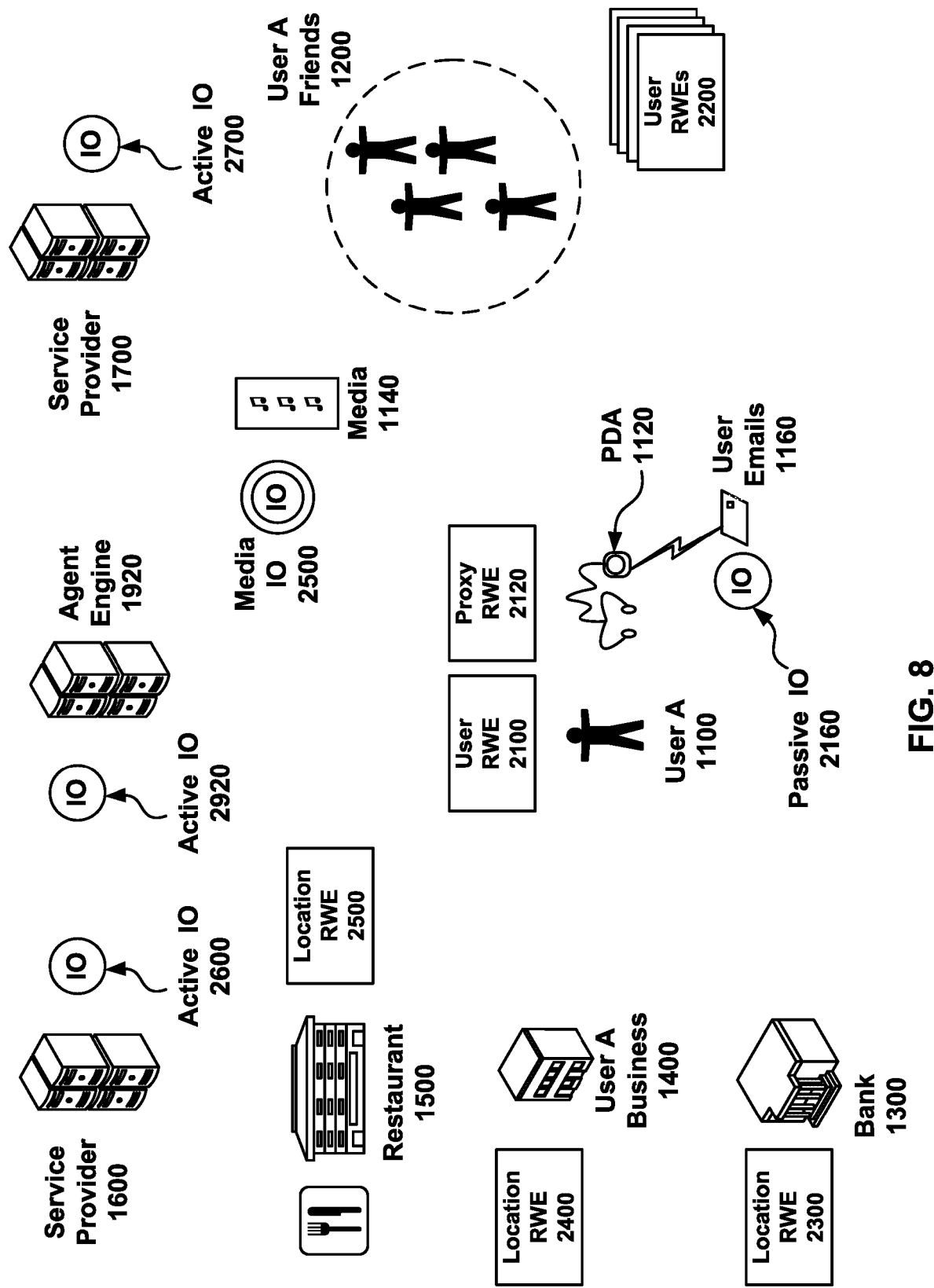
FIG. 8 illustrates one embodiment of how the users, devices and associated data objects shown in FIG. 7 can be defined to a W4 COMN.

FIG. 8 illustrates one embodiment of how the users, devices and associated data objects shown in FIG. 7 can be defined to a W4 COMN.

Individuals 1100, and 1200 are represented as user RWEs, 2100 and 2200 respectively. User A's PDA is represented as a proxy RWE 2120. The bank 1300, User A's business 1400 and the restaurant 1500 are represented as location/business RWEs 2300, 2400 and 2500 respectively. The W4 COMN collects spatial data, temporal data, RWE interaction data, IO content data (e.g., media data), and user data including explicitly-provided and deduced social and relationship data for all of the RWEs shown in FIG. 8. Emails 1160, and media 1140, are, in one embodiment, defined to the W4 COMN as passive IOs 2160 and 2140. The Agent Engine 1920 and service providers 1600 and 1700 are defined to the W4 COMN as active IOs 2920, 2600 and 2700 respectively.

Figure 9:
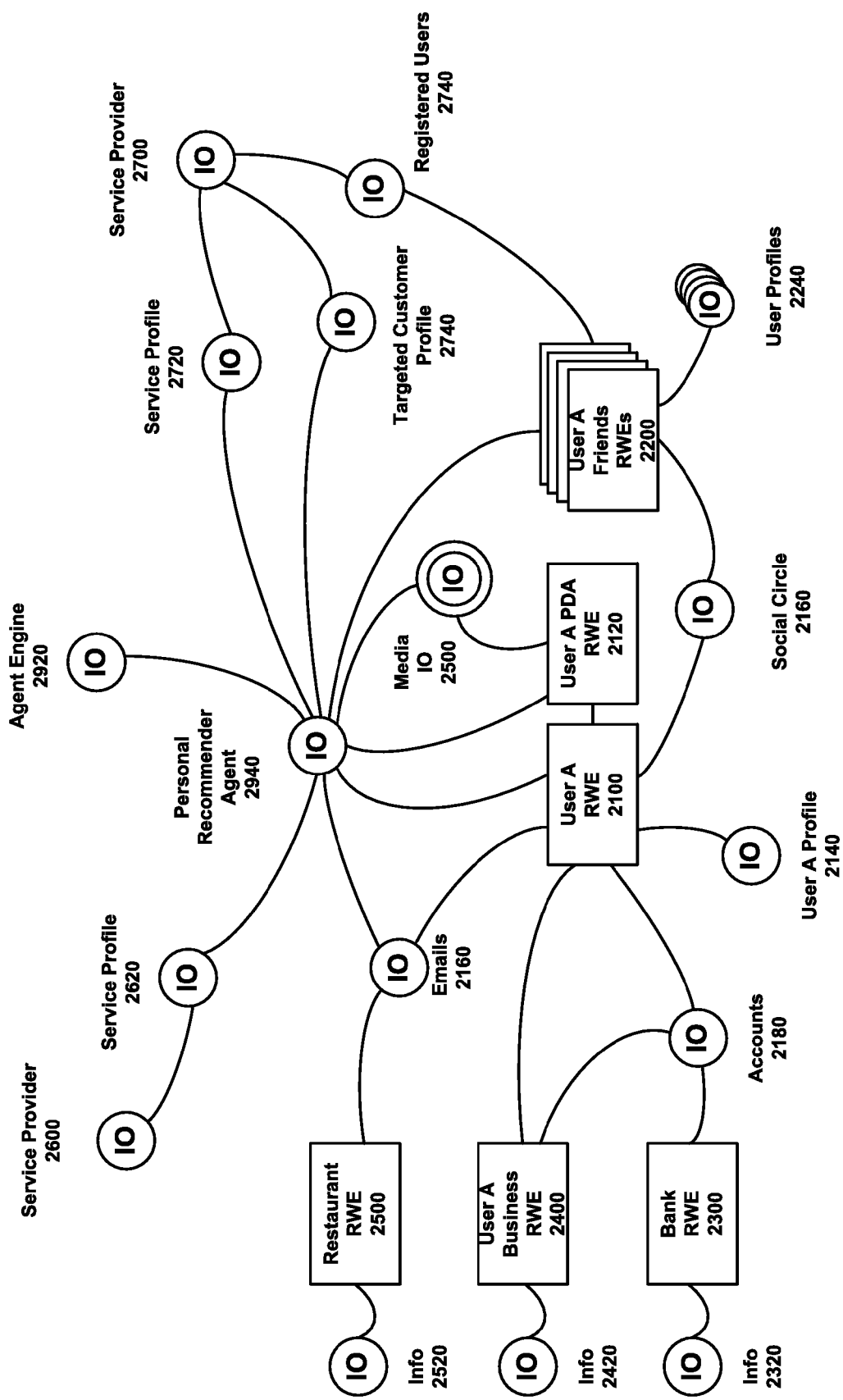
FIG. 9 illustrates one embodiment of a data model showing how the RWEs and IOs shown in FIG. 8 can be utilized in making service recommendations to users of a W4 COMN.

FIG. 9 illustrates one embodiment of a data model showing how the RWEs and IOs shown in FIG. 8 can be utilized in making service recommendations to users of a W4 COMN.

The Agent Engine 2920, in response to a request submitted by User A 2100, spawns a Personal Recommender Agent (PRA) 2940. The PRA 2940 is an active IO within the W4 COMN that can access data available to the W4 COMN and determine a user's potential interest in one or more services available via the W4 COMN, then facilitate the automation of matching users to services and enrolling users in services. User A 2100 may have submitted a request for a PRA 2940 using his or her PDA 2120, or the PRA may have be generated automatically, for example, on a scheduled basis or in response to an event, such as a user transaction or email The PRA 2940 may search for any type of service of possible interest to User A 2120, or may be limited to a field of interest (e.g. banking or finance.)

The PRA 2940 mines all of the spatial, temporal, social and topical data available to the W4 COMN that relates directly, or indirectly to User A 2100 to form a dynamic picture of User A's activities, needs and interests. In the illustrated embodiment, User A 2100 has a profile 2140 that provides various types of information about User A that can include demographics and user interests. The PRA 2940 can mine User A's emails 2160 for information about User A 2100. For example, one or more of User A's emails 2160 may indicate User A dines at restaurant 2500. The restaurant's business profile/information 2520 reveals the type of food the restaurant serves, and, indirectly, suggests the kind of food favored by User A 2100. The PRA 2940 can determine what media User A 2100 listens to, for example, by identifying media 2500 associated with User A's PDA 2120. Metadata within the media 2500 can reveal the performer and the genre of the music, giving insight into User A's musical preferences.

The PRA 2940 can further determine though relationships within the W4 COMN that User A 2100 owns and manages a business 2400 and that both User A and User A's business have bank accounts 2140 at bank 2300. In one embodiment, the PRA 2940, if authorized by User A, can mine transactions within the bank accounts 2180 to gain insight into User A's income and expenses. Business information 2420 and 2340 associated with User A's business 2400 and with User A's bank 2300 reveal the type of business that User A is in and the type of bank favored by User A. The business 2400 and the bank 2300 can be additionally associated with a potentially unbounded set of RWEs and IOs representing spatial, temporal, social and topical relating to the business or the bank respectively (e.g. news, reviews, customer base, and so forth.) The PRA 2940 can mine this data to any desired depth in order to form a detailed picture of User A's business and bank, which can be suggestive of topics or services that User A 2100 may have an interest in.

User A 2100 is further associated a group of friends 2200 though a social circle 2160 which can be a list of friends maintained by User A within User A's profile 2140 or can be a list of friends within one or more social networking sites. Each of User A's friends 2200 has a profile 2240 that can include demographics and user interests. Each of User A's friends 2200 can be additionally associated with a potentially unbounded set of RWEs and IOs representing spatial, temporal, social and topical relating to each of the users interests, activities and associations. The PRA 2940 can mine this data to any desired depth in order to form a detailed picture of User A's friends, which can be suggestive of topics or services that User A 2100 may have an interest in alone or in common with certain sets or subsets of User A's friends.

The PRA 2940 identifies services of potential interest to User A 2100 by matching data mined from User A's various associations to available services, such as services 2600 and 2700 in FIG. 9. In one embodiment, the PRA 2940 matches user data to service profiles 2620 and 2720 published by service providers 2600 and 2700 that describe service offerings in detail. In one embodiment, the PRA 2940 additionally or alternatively matches user profile data to targeted user profiles published by service providers, such as, for example, the targeted user profile 2740 published by service provider 2700. In one embodiment, the PRA 2940 additionally or alternatively can determine if any of any of User A's friends 2200 are registered users 2740 of a service 2700.

Any services that the PRA 2940 determines may be of interest to User A 2100 can then be presented to User A on a user interface on User A's PDA 2120 or through any other suitable media such as, for example, via emails. In one embodiment, the PRA 2940 provides a means for User A to select and enroll in one or more of such suggested services, such as, for example, by providing a user interface displayable on User A's PDA 2120. In one embodiment, User A 2100 is automatically enrolled for a trial period for all recommended services. In one embodiment, the Agent Engine 1900 provides a Enrollment Agent (EA) that facilitates User A's enrollment in services (discussed in greater detail below.)

In one embodiment, within a W4 COMN, the relationships shown in FIG. 9 are built and maintained by one or more correlation engines within a W4 engine which services the W4 COMN. The creation of such relationships may be automatic and part of the normal operation of the W4 COMN. Alternatively, such relationships can be created on demand.

Figure 10:
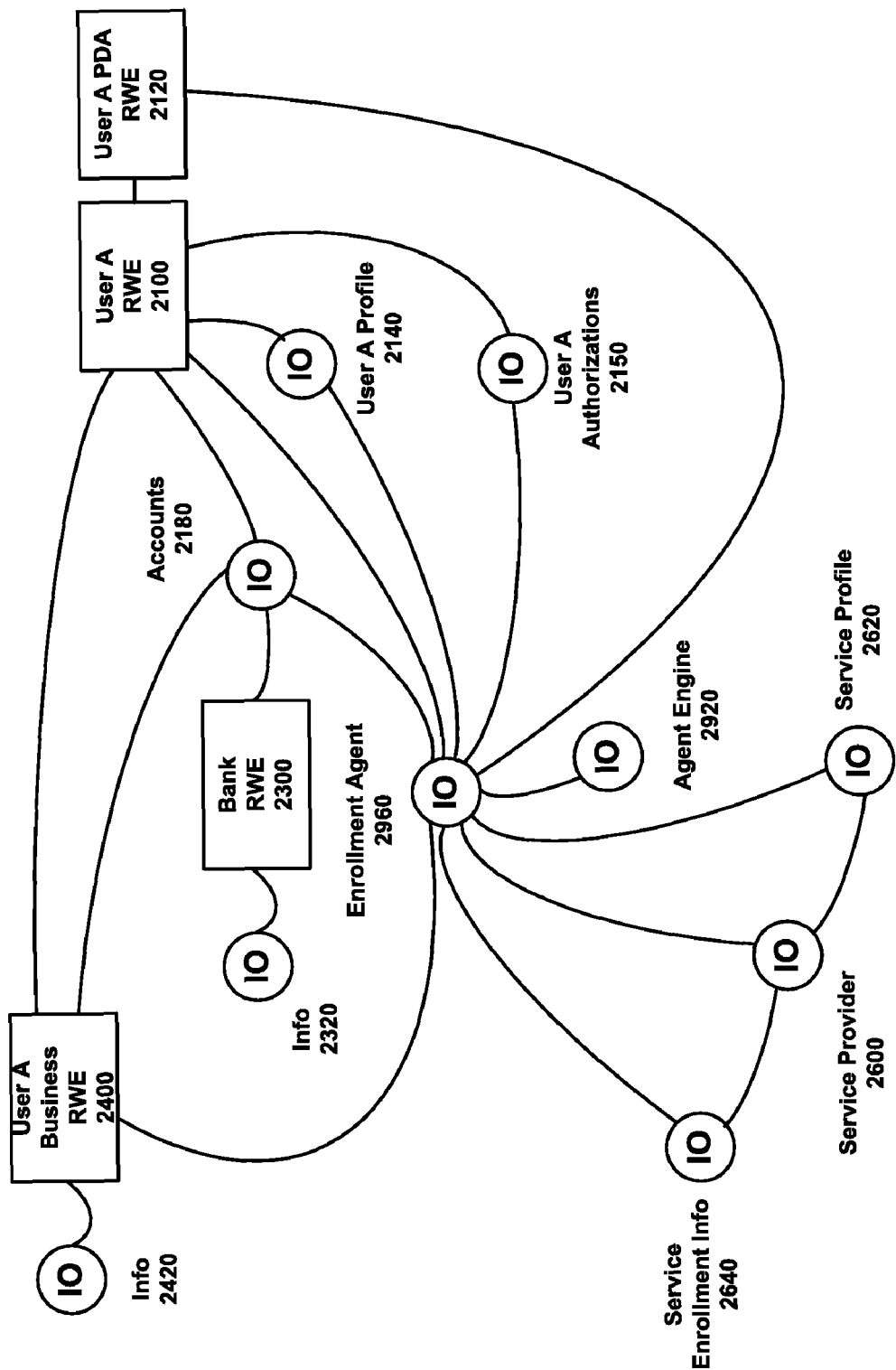
FIG. 10 illustrates one embodiment of a data model showing how the RWEs and IOs shown in FIG. 8 can be utilized in facilitating enrollment of users of a W4 COMN.

FIG. 10 illustrates one embodiment of a data model showing how the RWEs and IOs shown in FIGS. 8 and 9 can be utilized to facilitate enrollment of users of a W4 COMN in services available via the W4 COMN.

The Agent Engine 2920, in response to a request submitted by User A 2100, spawns a Personal Recommender Agent (PRA) 2940. The PRA 2940 is an active IO within the W4 COMN that can access data available to the W4 COMN and determine a user's potential interest in one or more services available via the W4 COMN. User A 2100 may have submitted a request for a PRA 2940 using his or her PDA 2120, or the PRA may have be generated automatically, for example, on a scheduled basis or in response to an event, such as a user transaction or email The PRA 2940 may search for any type of service of possible interest to User A 2120, or may be limited to a field of interest (e.g. banking or finance.)

The PRA 2940 mines all of the spatial, temporal, social and topical data available to the W4 COMN that relates directly, or indirectly to User A 2100 to form a dynamic picture of User A's activities, needs and interests. In the illustrated embodiment, User A 2100 has a profile 2140 that provides various types of information about User A that can include demographics and user interests. The PRA 2940 can mine User A's 2160 emails for information about User A 2100. For example, one or more of User A's emails 2160 may indicate User A dines at restaurant 2500. The restaurant's profile 2520 reveals the type of food the restaurant serves, and, indirectly, suggests the kind of food favored by User A 2100. The PRA 2940 can determine what media User A 2100 listens to, for example, by identifying media 2500 associated with User A's PDA 2120. Metadata within the media 2500 can reveals the performer and the genre of the music, giving insight into User A's musical preferences.

The PRA 2940 can further determine though relationships within the W4 COMN that User A 2100 owns and manages a business 2400 and that both User A and User A's business have bank accounts 2140 at bank 2300. In one embodiment, the PRA 2940, if authorized by User A, can mine transactions within the bank accounts 2140 to gain insight into User A's income and expenses. Business information 2420 and 2340 associated with User A's business 2400 and with User A's bank 2300 reveal the type of business that User A is in and the type of bank favored by User A. The business 2400 and the bank 2300 can be additionally associated with a potentially unbounded set of RWEs and IOs representing spatial, temporal, social and topical relating to the business or the bank respectively (e.g. news, reviews, customer base, and so forth.) The PRA 2940 can mine this data to any desired depth in order to form a detailed picture of User A's business and bank, which can be suggestive of topics or services that User A 2100 may have an interest in.

User A 2100 is further associated a group of friends 2200 though a social circle 2160 which can be a list of friends maintained by User A within User A's profile 2140 or can be a list of friends within one or more social networking sites. Each of User A's friends 2200 has a profile 2240 that can include demographics and user interests. Each of User A's friends 2200 can be additionally associated with a potentially unbounded set of RWEs and IOs representing spatial, temporal, social and topical relating to each of the users interests, activities and associations. The PRA 2940 can mine this data to any desired depth in order to form a detailed picture of User A's friends, which can be suggestive of topics or services that User A 2100 may have an interest in.

The PRA 2940 identifies services of potential interest to User A 2100 by matching data mined from User A's various associations to available services, such as services 2600 and 2700 in FIG. 9. In one embodiment, the PRA 2940 matches user data to service profiles 2620 and 2720 published by service providers 2600 and 2700 that describe service offerings in detail. In one embodiment, the PRA 2940 additionally or alternatively matches user profile data to targeted user profiles published by service providers, such as, for example, the targeted user profile 2740 published by service provider 2700. In one embodiment, the PRA 2940 additionally or alternatively can determine if any of any of User A's friends 2200 are registered users 2740 of a service 2700.

In one embodiment, the W4 COMN can build a service profile for a service provider if none is provided (or supplement an existing profile.) For example, the W4 COMN could analyze user profile data for all registered users of a service to create a composite profile for a typical user of a service. The W4 COMN could identify clusters of services that users commonly enroll in (e.g. users enrolled in service X typically enroll in service Y and Z, even if there is no other obvious relationship.) The W4 COMN could identify a relationship between an enrollment in a service and user interest in some topic T.

Any services that the PRA 2940 determines may be of interest to User A 2100 can then be presented to User A on a user interface on User A's PDA 2120 or through any other suitable media such as, for example, via emails. In one embodiment, the PRA 2940 provides a means for User A to select and enroll in one or more of such suggested services, such as, for example, by providing a user interface displayable on User A's PDA 2120. In one embodiment, the PRA 2940 automatically initiates enrollment of User A 2100 for all recommended services for a trial period. In one embodiment, the Agent Engine 1900 provides a Enrollment Agent (EA) that facilitates User A's enrollment in services (discussed in greater detail below.)

In one embodiment, within a W4 COMN, the relationships shown in FIG. 9 are built and maintained by one or more correlation engines within a W4 engine which services the W4 COMN. The creation of such relationships may be automatic and part of the normal operation of the W4 COMN. Alternatively, such relationships can be created on demand.

FIG. 10 illustrates one embodiment of a data model showing how the RWEs and IOs shown in FIG. 8 can be utilized in facilitating enrollment of users of a W4 COMN.

Enrollment in network-based services can be time-consuming, requiring the entry of a great deal of information and may require a user to gather information that the user has not committed to memory or which may not be readily accessible (e.g. bank routing codes, account numbers, parcel numbers on real estate, business income or expenses and consumption patterns. Much of this information may be accessible, however, on a W4 COMN, and thus, enrollment in services by users of a W4 COMN may be able to be significantly, or completely, automated.

In one embodiment, the Agent Engine 2920 spawns an Enrollment Agent (EA) 2960 in response to a request submitted by User A 2100 to enroll in a service provided by a service provider 2600. The EA 2960 is an active IO within the W4 COMN that can access data available to the W4 COMN relating to users and use such data to facilitate enrollment of users in such services. User A 2100 may have selected a service recommended by a PRA using his or her PDA 2120, or the EA may have be generated automatically, for example, by an automatic selection of all services identified by a PRA for a given user The service provider 2600 can, in one embodiment, provide registration information 2640 that provides detailed instructions to EAs for enrolling users in services provided by the service provider. Such instructions could include an identification of user data required by the service provider 2600, as well as a description of the service provider's API for interfacing with EAs. Based on the service provider's enrollment instructions 2640, the EA 2960 can, using existing data and relationships within the W4 COMN, gather required information regarding User A 2100. As shown in the illustrated embodiment, such required information could include user profile information, 2140, business profile information 2420 and banking information 2300, 2320 and 2180.

Such information could also include any other type of spatial, temporal, social and topical data available to the W4 COMN that relates directly, or indirectly to User A 2100 if the service provider wishes a more detailed picture of User A's activities, needs and interests. After the EA 2960 has gathered all required information for enrolling User A 2100 in a service provided by the service provider 2600, the EA can then automatically enroll User A in the service. In one embodiment, where additional information is required, the EA 2960 can prompt User A for additional information, for example, using a user interface on User A's PDA 2120.

Some information, such as bank account information 2180 or user social security numbers (e.g. within profile data or account data) may be considered sensitive and User A 2100 may wish to secure such information from access by the general public. In one embodiment, an EA 2960 is only able to access such information if User A has expressly authorized the EA to have access to such information. In one embodiment, such authorizations are stored as a passive IO 2150 associated with User A 2100 and the EA 2940. Such authorizations may additionally authorize the EA to enter into legally binding transactions on behalf of User A without explicit approval by User A (i.e. a Legally Authorized Agent.)

In one embodiment, within a W4 COMN, the relationships shown in FIG. 10 are built and maintained by one or more correlation engines within a W4 engine which services the W4 COMN. The creation of such relationships may be automatic and part of the normal operation of the W4 COMN. Alternatively, such relationships can be created on demand.

Figure 11:
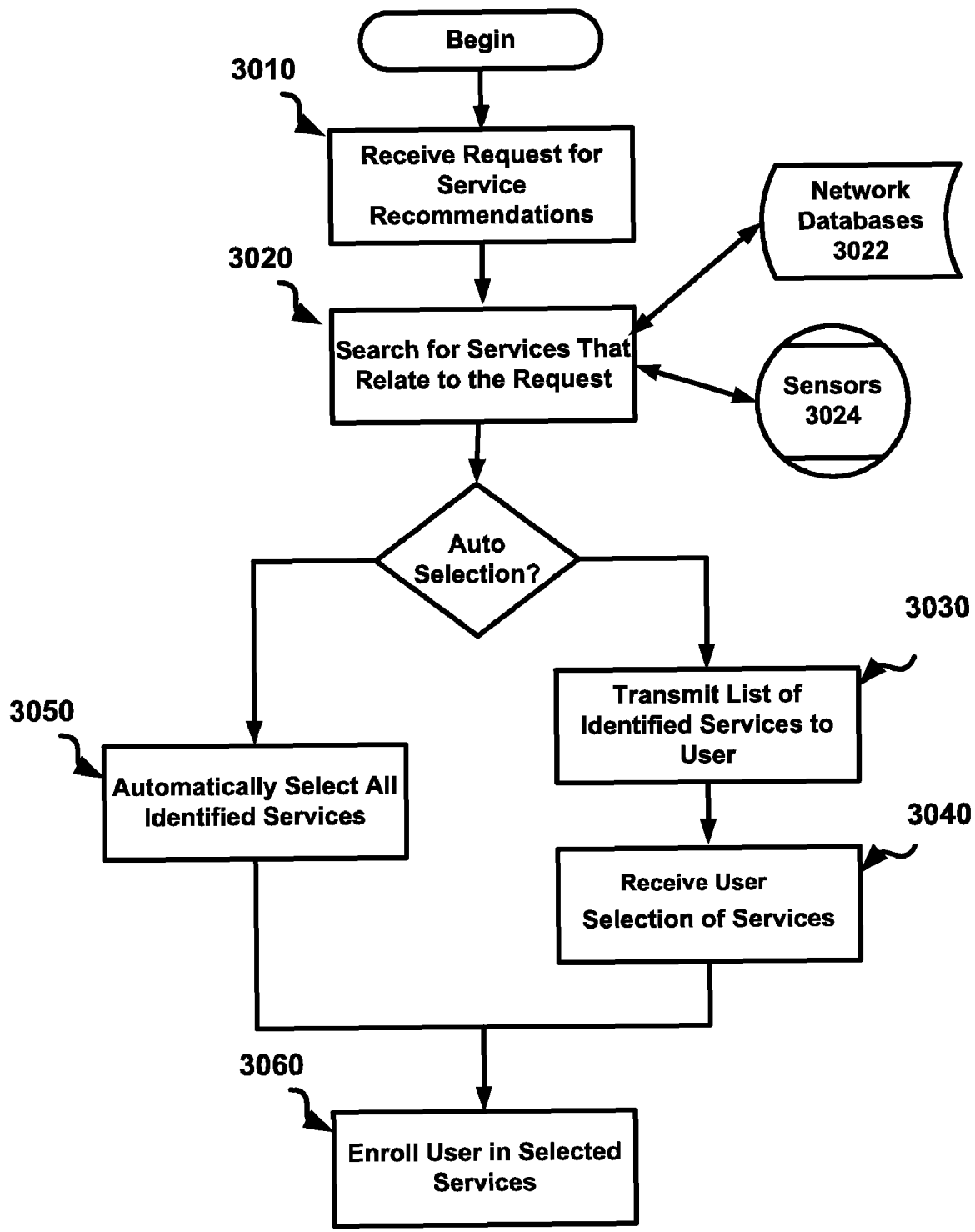
FIG. 11 illustrates one embodiment of a process 3000 of how a network, for example, a W4 COMN, can use temporal, spatial, and social data relating to a users to facilitate identification and enrollment in services provided via the network.

FIG. 11 illustrates one embodiment of a process 3000 of how a network, for example, a W4 COMN, can use temporal, spatial, and social data relating to a users to facilitate identification and enrollment in services provided via the network.

A request for service recommendations is received 3100 via a network. The request may have may have been submitted by a user using, for example, a portable media player, PDA, computer, or cell phone or any other network connectable device. Alternatively, the request may have be generated automatically, for example, on a scheduled basis or in response to an event, such as a user transaction or email. The request comprises, at a minimum, an identification of the requesting user and can additionally comprise one or more service selection criteria.

In one embodiment, if no service selection criteria are provided, the process uses a default service selection strategy. Such a default selection strategy can, in one embodiment, select all services the user is not currently enrolled in that relate to user activities, interests and needs. If service selection criteria are provided, the criteria can be any combination of spatial, temporal, social or topical criteria that describe data potentially relating to a service, for example, the attributes of a service, the attributes of users of a service, third party reviews of a service, and so forth. In one embodiment, the criteria can be related to one another using standard relational or set operators. In one embodiment, the query can be stated as a natural language query The request for service recommendations is then used to formulate a query so as to search 3020, via the network, for user profile data, spatial data, temporal data, social data and topical data that is available via the network and relates to the requesting user, the service selection criteria and to services available via the network so as to identify a subset of the plurality of services available via the network that relate to the request. In one embodiment, data available to the network includes network databases 3022 and network sensors 3024.

In one embodiment, data relating to services available via the network comprises service profiles created by service providers or service provider aggregators or third parties to describe service offerings. In one embodiment, data relating to services available via the network comprises target user profiles created by service providers to describe service offerings. In one embodiment, data relating to services available via the network further includes composite profiles of typical users of the service. In one embodiment, the process does not select services the user has already enrolled in.

In one embodiment, data relating to services available via the network further includes predictive models generated by the W4 COMN that empirically predict what type of users that are likely to find a service of value. For example, the W4 COMN could identify clusters of services that users commonly enroll in (e.g. users enrolled in service X typically enroll in service Y and Z, even if there is no other obvious relationship) or the W4 COMN could identify a relationship between a enrollment in a service and user interest in some topic T.

The ability of the process to identify services of interest to a user increases in precision over time as more and more data is accumulated relating to the user. In one embodiment, services of interest are identified to an increasing degree over time based on actual user transactions and activities, as opposed to predictive models. In one embodiment, the process attempts to match actual actions, events, or communications to an instance of how that situation could have been automated, avoided, reduced or increased as necessary by a known W4 service.

A list of the of the identified subset of services available via the network that were identified in step 3020 are then transmitted to the requesting process or user 3030. The list can be presented to the requesting user in any form that is suitable for the presentation of electronic information. For example, via a user interface on a portable media player, PDA, computer, or cell phone or any other network connectable device, or via an electronic document such as an email, a HTTP document or an XML document.

The user can then select 3040 one or more services to enroll in. Alternatively, in one embodiment, the user can grant the process authority 3050 to automatically enroll the user in all recommended services for a limited duration. In such case, step 3030 and step 3040 are bypassed and all services are automatically selected The user is then enrolled in the selected services 3060. In one embodiment, the requesting user is prompted via a user interface for data required for enrollment in each selected service. In one embodiment, for each selected service, a query is formulated to search, via the network, for user profile data, spatial data, temporal data, social data and topical data that is available via the network and relates to the requesting user and the data required by the service for enrollment, and if all required data is available via the network, the user is not prompted and the information is gathered from the available sources.

In one embodiment, the user is prompted to grant the process permission to access to sensitive data (e.g. SSN, bank accounts, and so forth.) In one embodiment, if the user has granted the process authority 3050 to automatically enroll the user in recommended services, permission to access sensitive data can be implied.

Figure 12:
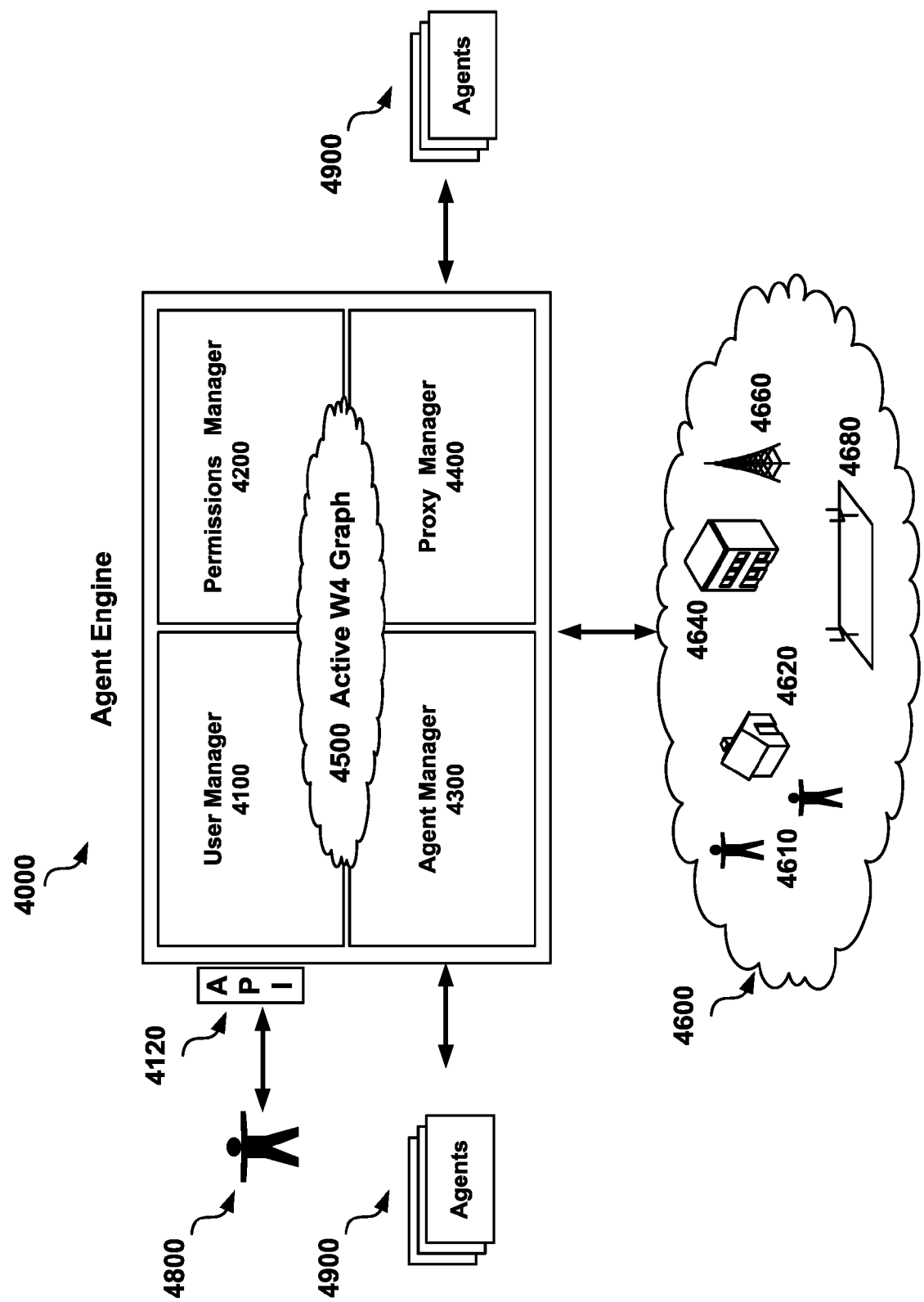
FIG. 12 illustrates one embodiment of an Agent Engine capable of supporting processes such as that illustrated in FIG. 11 that provides automated service recommendations and enrollment within a network, such as a W4 COMN, having temporal, spatial, and social data relating to a users and to available services.

FIG. 12 illustrates one embodiment of an Agent Engine 4000 capable of supporting processes such as that illustrated in FIG. 11 that provides automated service recommendations and enrollment within a network, such as a W4 COMN, having temporal, spatial, and social data relating to a users and to available services.

The Agent Engine 4000 comprises four managers, a User Manager 4100, a Permissions Manager 4200, an Agent Manager 4300 and a Proxy Manager 4400. In one embodiment, the Agent Engine 4000 is a component of a W4 COMN. In another embodiment, the socially aware identity manager engine resides on one or more servers and is connected to a network that has access to spatial, social, temporal and topical data relating to a plurality of users. In one embodiment, each of the managers 4100, 4200, 4300 and 4400 are comprised of one or more modules, some of which can be shared between one or more managers. One or more of such modules may be components of other engines within a W4 COMN.

The User Manager 4100 provides facilities that allow end users to access the services of the Agent Engine 4000. The User Manager 4100 provides at least one interface that allow users to enter in requests for service recommendations. Such requests each comprise, at a minimum, an identification of the requesting user and can additionally comprise one or more service selection criteria. In one embodiment, if no service selection criteria are provided, the process uses a default service selection strategy. Such a default selection strategy can, in one embodiment, select all services the user is not currently enrolled in that relate to user activities, interests and needs. For example, the default service selection criteria may be based on all or some of the user's data profile, e.g. W4 COMN graph contours, matching other known users of specific services having the same contours, in order to match the user to a type or class of users based upon data correlations between the subject user and known users of the service.

If service selection criteria are provided, the criteria can be any combination of spatial, temporal, social or topical criteria that describe data potentially relating to a service, for example, the attributes of a service, the attributes of users of a service, third party reviews of a service, and so forth. In one embodiment, the criteria can be related to one another using standard relational or set operators. In one embodiment, the query can be stated as a natural language query In one embodiment, the User Manager 4100 causes the Agent Manager to assign a unique Personal Recommender Agent (PRAs) to every user requesting service recommendations. A PRA for a user analyzes all known raw data on the user. In some embodiments, a rich set of data provides ample source for matching to known services with exact examples, while in other embodiments, the PRA includes an automated data search and retrieval module for accessing known public sources of information to gather data on the user, while in others that data gathering phase also includes a set period of time or diversity of data sets gathered from a new W4COMN user.

In one embodiment, the W4 COMN continuously gathers spatial, temporal, social and topical data relating to entities known to the network 4600, which can include persons 4610, locations 4620, businesses 4640, sensors 4660, and events 4680. In one embodiment, using spatial, temporal, social and topical data available about a specific user, topic or logical data object every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

A PRA can use these relationships to form a detailed and dynamic picture of the user's activities, interests and needs. In one embodiment, PRA uses requests for service recommendations to formulate a queries so as to search, via the network, for user profile data, spatial data, temporal data, social data and topical data that is available via the network and relates to the requesting user, the service selection criteria and to services available via the network so as to identify services available via the network that relate to data associated with the requesting user.

In one embodiment, data relating to services available via the network comprises service profiles created by service providers to describe service offerings. In one embodiment, data relating to services available via the network comprises target user profiles created by service providers to describe service offerings. In one embodiment, data relating to services available via the network further includes composite profiles of typical users of the service. In one embodiment, the process does not select services the user has already enrolled in.

In one embodiment, data relating to services available via the network further includes predictive models generated by the W4 COMN that empirically predict what type of users that are likely to find a service of value. For example, the W4 COMN could identify clusters of services that users commonly enroll in (e.g. users enrolled in service X typically enroll in service Y and Z, even if there is no other obvious relationship) or the W4 COMN could identify a relationship between a enrollment in a service and user interest in some topic T. In one embodiment, services can be packaged into groups based upon known preferences and specializations, e.g. the Parent or Family pack, the Sales professionals pack, the CPAs, Attorneys, etc.

In one embodiment, the User Account Manager periodically or continuously analyzes the user's W4 data against W4 services as they continue, are modified, discontinued or become newly available to change the mix of services or recommendations. Over time, the W4 Agent Engine generates a predictive models correlating successful enrollment and continued use/payment of W4 services with a specific contour or set of contours in the global W4 Graph. A threshold of relatedness is created between the contours or sets of contours associated with existing W4 services customers, and once a new user has enough markers of relatedness beyond the threshold, they are recommended that W4 service. Such thresholds can be complex dependencies of vectors to customize the nature of the recommendations, e.g. type of scheduling or communications agents.

Once the threshold of reliable data is achieved, whether immediate or upon accumulation, the PRA makes a first set of recommendations for W4 services to end users. This is done by matching an actual action, event, communication or other time-space-social-topical/objectual aspect of a user's actual life to an instance of how that situation could have been automated, avoided, reduced or increased as necessary by a known W4 service. In one embodiment, the PRA's recommendations are presented to end user as a list displayed on a user interface provided by the User Manager 4100. In one embodiment, the PRAs remains active or are periodically reinitiated and new sets of recommendations reflecting users real-time data profile are periodically created and presented to users automatically.

In one embodiment, the interface provided by the User Manager 4100 allows end users to select one or more recommended services. Alternatively, in some embodiments, the user grants the PRA authority for limited duration enrollments into W4 services, and thus can initially turn on all the services that it would recommend for a user so that the user simply experiences what an agent would do in each context within which the W4 Agents operate as proxies, e.g. user sees advanced scheduling options in calendar, W4 conditionals in SMS or email editors, W4 sponsored content or marketing package options display when user's blog. When an recommended service is selected, the User Manager 4100 causes the Agent Manager 4300 to spawn a Enrollment Agent to enroll the user in the selected service.

In one embodiment, the User Manager 4100 further provides an interface for users to track and manage their agents and/or agent coordinating applications or service programs. Users may have access to their own individual, group, interest group, organization, corporation, etc. data in successive layers of relatedness and intimacy/importance of relatedness. For example, one employee may not be able to browse or access specific data for another employee's W4 COMN profile, but they each might have access to a company or department-wide aggregated data stream stripped of personally identifiable information.

The Permissions Manager 4200 allows users to specify define default and specific permissions granted to Agents acting on behalf of the users. Such permissions can include permissions granted to Agents to automatically enroll users in services. Such permissions may also define user data that users regard as sensitive or not to be disclosed without explicit authorization. The Permissions Manager 4200 can supply a separate user interface for gathering permissions data or, in one embodiment, gather data through interfaces provided by the User Manager 4100.

At one pole of preferences, a user could adopt a completely open data stream or a completely closed data stream depending on preference or purpose for an identity. Users can also aggregate many private and personal personas for their own use and browsing, but can separate, filter or otherwise modify their data before sharing based upon the context of the request, the sharing entity, the uni, bi, tri or multilateral nature of the exchange, ongoing or one-time, related to other exchanges, agents or meta-agents.

In one embodiment, user's W4 data entities can all be mapped to one of a series of classes of sharing with the most intimate friends and family members participating in a full share data aggregation but limited browsing environment, then another level for associates and colleagues, another for known strangers and a series of others personalized for dealing with classes or types of strangers based upon personal preference or programming.

The Agent Manager 4300 certifies Agent types, stores Agent definitions and spawns Agents in response to requests to create Agents by users or by other components of the Agent Engine 4000. In one embodiment, a published syntax and meta-model enables explicit Agent creation and definition by any entity or service provider. These W4 Agents can, on account of their modular nature, be coupled and combined to track and exploit W4 COMN data for enhanced W4 Services. In one embodiment, Agents can be publicly visible to all users, or can be fully private with fully private ownership, goals and perhaps even existence and support a whole spectrum of transactions from fully public to fully private. In one embodiment, users can grant Agents secure access to sensitive user data.

In one embodiment, the Agent Manager is capable of spawning PRAs and EAs for individual users in response to requests from end users submitted via the User Manager 4100 for service recommendations and service enrollment. In one embodiment, ongoing services provided by W4 COMN can additionally be mediated through Service Agents (SAs) that mediate interactions between a user and a Service application. Such SAs can be spawned and managed by the Agent Manager as well.

The Proxy Manager 4400 verifies that Agents acting on the W4 COMN have legally sufficient authorization to act as proxies for users In one embodiment, whether independently or through a meta-agent manager application, each Agent registers with the Proxy Manger 4400, which conducts any necessary approval or verification interaction with actual user and then generates a W4 services model for the Agent on the Network. Agent service models serve both as the objective-specifying registration of Agents on the Network, and thus also potential future legal evidence in any dispute resolution, e.g. electronic contracts.

In some embodiments the Proxy Manager serves a quasi-public function including auditing of Agent information and actions to law enforcement or ADR authorities. In embodiments where Agents are not conducting legal transactions, the Proxy Manager of those W4 Agent Engine embodiments manage the access and privacy of users within their layers of sharing preferences.

If the Agent is one spawned for a specific W4 Service by a Network or third-party Service provider, the Agent registers the user on behalf of the user, executing necessary contracts and payments to initiate the service. In one embodiment, the Service then checks with the quasi-public index of the Proxy Manager for verification of the Agent's status, more info on the RWE behind the agent (if available) and any limitations or record-keeping obligations of the Agent of which the Service should be appraised.

In one embodiment, the Proxy Manager 4400 interacts with the Permissions Manager 4200 to determine what level of authorization users have granted to Agents to act on the user's behalf. In one embodiment, the Proxy Manager 4400 interacts with the Permissions Manager 4200 to determine what data users regard as sensitive (i.e. not to be automatically disclosed.)

Once an Agent has been registered and cleared for action on the Network by the Proxy Manager 4400, the Agent Manager 4300 turns on the Agent, and it is free to act within its granted areas with full autonomy and interactability with the Network, with content and resources, with users and with other agents working on behalf of other users. For example, a registered PRA can act as a proxy for the W4 services to enroll the user, or simply hand the user off to each of the relative W4 services and sub-services applications for gathering data, permissions and preferences.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:

receiving a request, over a network, from a user for service recommendations, the request comprising an identification of the user and service selection criteria, the service selection criteria comprising spatial, temporal, social and topical criteria;

in response to receiving the request, formulating a query so as to search, via the network, for user profile data, spatial data, temporal data, social data and topical data that is available via the network and relates to the requesting user, the service selection criteria and to a plurality of services available via the network so as to a identify a subset of the plurality of services available via the network that relate to the request, the query being formulated so as to use a global index of data available to the network, the global index comprising a global graph that interrelates entities known to the network with one another;

transmitting, over the network, a list of the subset of the plurality of services to the user;

receiving, over the network, from the user, a selection of one service of the subset of the plurality of services;

in response to receiving the selection of the one service of the subset of the plurality of services, enrolling the user in the selected one service of the subset of the plurality of services.

2. The method of claim 1 wherein if no service selection criteria are provided, the formulating step uses default service selection criteria.

3. The method of claim 1 wherein the service selection criteria are related to one another using relational or set operators.

4. The method of claim 1 wherein the service selection criteria are stated as a natural language query.

5. The method of claim 1 wherein the data relating to the plurality of services comprise a service profile of one service of the plurality of services.

6. The method of claim 1 wherein the data relating to the plurality of services available via the network comprise a target user profile of one service of the plurality of services.

7. The method of claim 1 wherein the data relating to plurality of services comprise a predictive model relating to one service of the plurality of services.

8. The method of claim 1 wherein the enrolling step comprises prompting the user via a user interface for data required for enrollment in the selected one service of the subset of the plurality of services.

9. The method of claim 8 wherein if the query in the enrolling step returns all data required for enrollment in the selected one service of the subset of the plurality of services, the user is not prompted for any additional information.

10. The method of claim 8 wherein if the query in the enrolling step returns data required for enrollment in the selected one service of the subset of the plurality of services that is sensitive user data, the user is prompted to give permission to the enrolling step to retrieve the sensitive user data.

11. The method of claim 1 wherein the enrolling step comprises formulating a query so as to search, via the network, for user profile data, spatial data, temporal data, social data and topical data that is available via the network and relates to the user and to the selected one service of the subset of the plurality of services so as to retrieve data required for enrollment in the selected one service of the subset of the plurality of services.

12. The method of claim 1 additionally comprising:
receiving an authorization, via the network, from the user to automatically enroll the user in all services of the subset of the plurality of services that relate to the request, wherein the transmitting and receiving a selection steps are bypassed and the enrolling step enrolls the user in all services of the subset of the plurality of services.

13. The method of claim 12 wherein the user is enrolled in all services of the subset of the plurality of services for a trial period.

14. A system comprising:
a processor;
a storage medium for tangibly storing thereon program logic for execution by the processor, the program logic comprising:

logic executed by the processor for an agent manager that certifies agent types, stores agent definitions and spawns agents in response to commands to create agents;

logic executed by the processor for a permissions manager that enables users to define permissions granted to agents acting on their behalf and to define user data which is not to be disclosed without authorization;

logic executed by the processor for a proxy manager that verifies that agents have legally sufficient authorization to act as proxies for users, wherein agents spawned by the agent manager register with the proxy manager and are not allowed to execute agent functions until the agents are verified;

logic executed by the processor for a user manager that receives requests for service recommendations from users, wherein the requests each comprise a respective identification of a user and respective service selection criteria comprising spatial, temporal, social and topical criteria, such that, in response to each request, the user manager is configured to command the agent manager to spawn a respective personal recommender agent that identifies a subset of a plurality of services available via the network that relate to the request, each respective personal recommender agent being configured to formulate a respective query so as to search, via the network, for user profile data, spatial data, temporal data, social data and topical data that is available via the network and relates to the respective requesting user, the respective service selection criteria and to a plurality of services available via the network so as to identify the respective subset of the plurality of services available via the network that relate to the respective request, each respective query being formulated so as to use a global index of data available to the network, the global index comprising a global graph that interrelates entities known to the network with one another.

15. The method of claim 1 wherein the global graph that interrelates entities known to the network with one another is a histogram.

16. The method of claim 1 additionally comprising:
automatically generating, via the network, the request on a scheduled basis.

17. The method of claim 1 additionally comprising:
automatically generating, via the network, the request in response to an event selected from the list: a user transaction and an email.

18. The method of claim 1 wherein the data available to the network comprises a plurality of network databases and a plurality of sensors.

19. The method of claim 1 wherein the predictive model comprises a cluster of services users have enrolled in a plurality of instances.

20. The method of claim 1 wherein the predictive model comprises a relationship between a service and a topic.

21. The system of claim 14 wherein the permissions manager is configured to enable users to authorize personal recommender agents to automatically enroll users in all of the subset of a plurality of services selected in relation to requests for service recommendations.

22. The system of claim 14 wherein the user manager is further configured to transmit lists reflecting the identified subsets of the plurality of services that relate to requests to requesting users, and wherein the user manager is further configured to receive selections of services from the subsets of the plurality of services from users.

23. The system of claim 22 wherein for each selected service, the user manager is configured to command the agent manager to spawn a respective enrollment agent to enroll the requesting user in the respective selected service.

24. The system of claim 23 wherein enrollment agents are configured to prompt users via a user interface for data required for enrollment in the selected services.

25. The system of claim 24 wherein if the query formulated by the enrollment agent returns data required for enrollment in the selected services that is sensitive user data, the user is prompted to give permission to the enrollment agent to retrieve the sensitive user data.

26. The system of claim 23 wherein enrollment agents are configured to formulate a query so as to search, via the network, for user profile data, spatial data, temporal data, social data and topical data that is available via the network and relates to the users and selected services so as to retrieve data required for enrollment in the selected service.

27. The system of claim 26 wherein if the query formulated by the enrollment agent returns all data required for enrollment in the selected services, the user is not prompted for any additional information.

28. The system of claim 14 wherein if no service selection criteria are provided in a request for service recommendations, the personal recommender agent spawned in response to the request uses default selection criteria.

29. The system of claim 14 wherein the at least one service selection criteria are related to one another using standard relational or set operators.

30. The system of claim 14 wherein the at least one service selection criteria are stated as a natural language query.

31. The system of claim 14 wherein the data relating to a plurality of services available via the network comprise at least one service profile of at least one of the plurality of services.

32. The system of claim 14 wherein the data relating to a plurality of services available via the network comprise at least one composite profile of typical users of at least one of the plurality of services.

33. The system of claim 14 wherein the data relating to a plurality of services available via the network comprise at least one predictive model relating to at least one of the plurality of services.

34. A non-transitory computer-readable storage media for tangibly storing thereon computer-executable instructions for a method comprising:
  receiving a request, over a network, from a user for service recommendations, the request comprising an identification of the user and service selection criteria, the service selection criteria comprising spatial, temporal, social and topical criteria;
  in response to receiving the request, formulating a query so as to search, via the network, for user profile data, spatial data, temporal data, social data and topical data that is available via the network and relates to the requesting user, the service selection criteria and to a plurality of services available via the network so as to a identify a subset of the plurality of services available via the network that relate to the request, the query being formulated so as to use a global index of data available to the network, the global index comprising a global graph that interrelates entities known to the network with one another,
  transmitting, over the network, a list of the subset of the plurality of services to the user;
  receiving, over the network, from the user, a selection of one service of the subset of the plurality of services;
  in response to receiving the selection of the one service of the subset of the plurality of services, enrolling the user in the selected one service of the subset of the plurality of services.

35. The non-transitory computer-readable medium of claim 34 wherein if no service selection criteria are provided, the formulating step uses default service selection criteria.

36. The non-transitory computer-readable medium of claim 34 wherein the service selection criteria are related to one another using relational or set operators.

37. The non-transitory computer-readable medium of claim 34 wherein the service selection criteria are stated as a natural language query.

38. The non-transitory computer-readable medium of claim 34 wherein the data relating to the plurality of services comprise a service profile of one service of the plurality of services.

39. The non-transitory computer-readable medium of claim 34 wherein the data relating to the plurality of services comprise a target user profile of one service of the plurality of services.

40. The non-transitory computer-readable medium of claim 34 wherein the data relating to a plurality of services comprise a predictive model relating to one service of the plurality of services.

41. The non-transitory computer-readable medium of claim 34 wherein the enrolling step comprises prompting the user via a user interface for data required for enrollment in the selected one service of the subset of the plurality of services.

42. The non-transitory computer-readable medium of claim 34 wherein the enrolling step comprises formulating a query so as to search, via the network, for user profile data, spatial data, temporal data, social data and topical data that is available via the network and relates to the user and to the selected one service of the subset of the plurality of services so as to retrieve data required for enrollment in the selected one service of the subset of the plurality of services.

43. The non-transitory computer-readable medium of claim 42 wherein if the query in the enrolling step returns all data required for enrollment in the selected one service of the subset of the plurality of services, the user is not prompted for any additional information.

44. The non-transitory computer-readable medium of claim 42 wherein if the query in the enrolling step returns data required for enrollment in the selected one service of the subset of the plurality of services that is sensitive user data, the user is prompted to give permission to the enrolling step to retrieve the sensitive user data.

45. The non-transitory computer-readable medium of claim 34 additionally comprising:
  receiving an authorization, via the network, from the user to automatically enroll the user in all services of the subset of the plurality of services that relate to the request, wherein the transmitting and receiving a selection steps are bypassed and the enrolling step enrolls the user in all services of the subset of the plurality of services.

46. The non-transitory computer-readable medium of claim 45 wherein the user is enrolled in all services of the subset of the plurality of services for a trial period.

* * * * *